United States Patent Office 2,801,255
Patented July 30, 1957

2,801,255
METHOD OF PURIFYING PHOSPHATIDYL ETHANOLAMINE

Charles R. Scholfield and Herbert J. Dutton, Peoria, Ill., assignors to the United States of America as represented by the Secretary of Agriculture No Drawing. Application June 17, 1955, Serial No. 516,343

1 Claim. (Cl. 260—403)

(Granted under Title 35, U. S. Code (1952), sec. 266)

A non-exclusive, irrevocable, royalty-free license in the invention herein described, for all governmental purposes, with power to grant sublicenses for such purposes, is hereby granted to the Government of the United States of America.

This invention relates to the preparation of a relatively homogeneous preparation of phosphatides from a heterogeneous naturally occurring lecithin. It relates particularly to a production of cephalin-like fraction from crude naturally occurring phosphatides such as soybean lecithin. It, therefore, has among its objects the preparation of a relatively pure phosphatide fraction from a starting material which is notoriously heterogeneous and high in contaminants. The invention relates further to a novel method of obtaining a cephalin-like phosphatide.

Heretofore cephalin or cephalin-like phosphatides have been relatively rare as commercial items. A major reason is the scarcity of the former which must be prepared from animal brain material and the difficulty with which the latter could be prepared from vegetable sources. In a paper appearing May 1954, in the Journal of Biological Chemistry, the present inventors have described the process whereby vegetable phosphatides such as soybean phosphatide can be separated into two fractions by countercurrent-distribution between hexane and 95% methanol. The separation, though effective in producing a fraction rich in phosphatidyl ethanolamine is tedious and not applicable to the preparation of the material in quantity lots.

The alcohol insoluble fractions of the various vegetable phosphatides have been referred to in prior literature as "vegetable cephalin." This fraction has been disclosed in the literature as being particularly useful in forming oil-in-water emulsions. It is also disclosed as containing antioxidant bodies in concentrated form, compared to the whole vegetable phosphatides.

The present invention is an improvement over the process described in the Journal of Biological Chemistry in that it is a simplified method for the preparation of phosphatidyl ethanolamine which does not require the use of countercurrent-distribution. The product is of 85% or higher purity.

In general, according to the invention we start with the sugar-free, choline-free alcohol-insoluble fraction of vegetable phosphatides such as soybean phosphatides, corn phosphatides, cotton seed phosphatides, or the like. By "sugar-free" we mean free of uncombined sugar, making a distinction over sugar which is present in the phosphatide fraction in chemically combined state. A procedure for production of the starting material is set forth in Example 1 below. This alcohol-insoluble fraction is first dissolved in a solvent comprising water-saturated chloroform. The resulting solution is then mixed with 5–10 volumes of methanol and the mixture warmed to 40–45° C. This produces a precipitate which is removed and is redissolved in water-saturated chloroform and reprecipitated as before. The dissolution and precipitation may be repeated as many times as desired, depending upon the completeness of recovery desired. The solution remaining after separation of the precipitates also contains other impurities, not removed by the fractionation procedure and it is further purified by precipitation of the foreign material with lead salts and removal of the precipitate. The remaining solution is evaporated to dryness to recover the desired product, which will have a purity of 85% or higher.

EXAMPLE 1

*Preparation of sugar-free, choline-free, alcohol-insoluble fraction.*—Commercial soybean lecithin was first stirred with acetone, cooled to 10° C., and filtered on a Büchner funnel. The insoluble material was dissolved in hexane, precipitated by pouring into acetone, cooled to 10° C., and filtered. The precipitation of this insoluble material from hexane solution was repeated three times. In the first two precipitations, the mixture was cooled to 10° C., the last two precipitations were carried out at room temperature. Acetone was removed from the insoluble material under vacuum. From 768 gm. of commercial lecithin, 502 gm. of acetone-insoluble material were obtained. This material (493 gm.) was divided into three portions and each portion was extracted in a Waring blendor with 400 ml. of absolute alcohol. After filtration on a Büchner funnel, the insoluble material was divided into two portions, and the extraction was repeated five times at room temperature and five times with absolute alcohol warmed to 55–60° C. The solvent containing filter cake after the last extraction weighed 334 gm.

Sugar was removed by the following steps. Drying of a small sample indicated that it contained 36 percent alcohol. Hexane, water, and additional alcohol were added to the remainder of the wet cake to give a solution containing 3 ml. of 50 percent alcohol and 3 ml. of hexane for each gram of material. This mixture was shaken gently in a separatory funnel, centrifuged to break the emulsion, and separated into two layers. The hexane layer was extracted twice more with 50 percent alcohol. The hexane solution was then evaporated to about three-fourths of its original volume and added to 5 liters of acetone. After filtration on a Büchner funnel, the insoluble material was dried under vacuum. The foregoing method for sugar removal is described and claimed in our copending application Serial No. 262,163, filed December 17, 1951.

Alcohol-insoluble phosphatides low in sugar thus were obtained in a yield of 166 gm.

EXAMPLE 2

This example illustrates the preparation of the phosphatidyl ethanolamine of this invention. A 24.6-gm. sample of the sugar-free, choline-free, alcohol-insoluble fraction such as prepared in Example 1, was dissolved in 60 ml. of water-saturated chloroform and mixed with 500 ml. of methanol. The mixture was warmed to 40–45° C., allowed to cool to room temperature, and filtered to remove the produced precipitate. The precipitate was redissolved in water-saturated chloroform and reprecipitated five times in the same way. The progress of the fractionation was followed by evaporating and weighing 1-ml. aliquots of the chloroform filtrates. After the third reprecipitation the dissolved material in the filtrate is substantially reduced. Aliquots of the filtrates from these five reprecipitations gave values of 8.6 mg., 7.0 mg., 4.3 mg., 3.0 mg., and 1.9 mg., respectively.

The methanol solution contains phosphatidyl ethanolamine, inositol-containing phosphatidic acids, and other impurities. To the combined methanol filtrates, 45 ml. of a 30% lead acetate solution were added. Formed lead salts which precipitated were removed by filtration.

Carbon dioxide was passed into the filtrate and formed lead carbonate was filtered off to remove excess lead ions. The filtrate was evaporated to 235 ml. under vacuum. The solution was transferred to a separatory funnel with hexane and 250 ml. of water were added.

In this experiment the water layer gave a positive dithizone test for lead. However, washing twice with 1 percent acetic acid gave a negative test, and three more water washes removed residual acetic acid. The hexane solution was evaporated to dryness under vacuum leaving 4.89 gm. of a phosphatidyl ethanolamine concentrate.

The product contained 85.6 percent phosphatidyl ethanolamine based on its total nitrogen content and 86.5 percent phosphatidyl ethanolamine based on its phosphorous content. The product also contained 12.7 percent unsaponifiable material, principally sterol glycosides. The product analyzed 3.61 percent phosphorous, 1.62 percent nitrogen, 0.02 percent inosotol and 2.17 percent sugar.

We claim:

A process for producing phosphatidyl ethanolamine comprising dissolving the sugar-free, choline-free, alcohol-insoluble fraction of vegetable phosphatides in water-saturated chloroform, mixing the resulting solution with methanol, removing the produced precipitate, treating the remaining solution with lead acetate to precipitate insoluble lead salts of impurities, removing the precipitate of lead salts, and recovering phosphatidyl ethanolamine from the remaining solution.

References Cited in the file of this patent

Kleiner: "Human Biochemistry," 3rd edition (1951), pp. 88–89, The C. V. Mosby Company, St. Louis.